United States Patent
Scholz et al.

(10) Patent No.: US 8,661,042 B2
(45) Date of Patent: Feb. 25, 2014

(54) COLLABORATIVE FILTERING WITH HASHING

(75) Inventors: Martin B. Scholz, San Francisco, CA (US); Shyamsundar Rajaram, San Francisco, CA (US); Rajan Lukose, Oakland, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 189 days.

(21) Appl. No.: 12/906,551

(22) Filed: Oct. 18, 2010

(65) Prior Publication Data

US 2012/0096009 A1 Apr. 19, 2012

(51) Int. Cl.
G06F 7/00 (2006.01)
G06F 17/30 (2006.01)

(52) U.S. Cl.
USPC .......................................... 707/748; 707/747

(58) Field of Classification Search
USPC .................................. 707/748, 747
See application file for complete search history.

(56) References Cited

U.S. PATENT DOCUMENTS

| | | | |
|---|---|---|---|
| 2010/0030764 A1* | 2/2010 | Koren | 707/5 |
| 2010/0138443 A1* | 6/2010 | Ramakrishnan et al. | 707/769 |
| 2010/0169338 A1* | 7/2010 | Kenedy et al. | 707/758 |
| 2010/0250556 A1* | 9/2010 | Park et al. | 707/749 |
| 2011/0231405 A1* | 9/2011 | Herbrich et al. | 707/748 |
| 2011/0302155 A1* | 12/2011 | Yan et al. | 707/723 |
| 2012/0131034 A1* | 5/2012 | Kenedy et al. | 707/767 |
| 2012/0191714 A1* | 7/2012 | Datar et al. | 707/737 |

OTHER PUBLICATIONS

Stephen J. Redman, "Stochastic Sampling of a Binary Random Process—II", 1964, Monash University, pp. 39-43.*
Scholz, et al., "System and Method for Making a Recommendation Based in User Data", U.S. Appl. No. 12/430,411, filed Apr. 27, 2009, 27 pages.

* cited by examiner

*Primary Examiner* — Apu Mofiz
*Assistant Examiner* — Jared Bibbee

(57) ABSTRACT

Systems, methods, and machine readable and executable instructions are provided for collaborative filtering. Collaborative filtering includes representing users and objects by rows and columns in a binary ratings matrix having a particular dimensional space. Unknown values in the binary ratings matrix are weighted with a weight matrix having the particular dimensional space. The binary ratings matrix and the weight matrix are hashed into a lower dimensional space by one of row and column. The hashed binary ratings matrix and the hashed weight matrix are low-rank approximated by alternating least squares. A result of the low-rank approximation for the one of row and column is updated using the binary ratings matrix and the weight matrix. A recommendation of one of the objects can be generated for one of the users based on the updated result.

16 Claims, 4 Drawing Sheets

COLLABORATIVE FILTERING WITH HASHING

BACKGROUND

In a collaborative filtering setting (e.g., one class collaborative filtering), a binary ratings matrix can represent some form of "rating" by users over objects. For example, data contained in the binary ratings matrix could be whether or not one of many (e.g., hundreds of millions) of users visit one of many (e.g., billions) of uniform resource locators (URLs). The matrix is said to be binary because the data is limited to one of two states (e.g., "yes" or "no," which can be represented, for example, by a 1 or a 0). Such a binary ratings matrix may be sparse (e.g., populated mostly by zeros as users may not rate a significant percentage of the objects). However, substituting zeros for instances where a user's preference is unknown can yield poor results based on a faulty assumption. Scaling collaborative filtering in this setting may be a technical challenge.

DETAILED DESCRIPTION

Figure 1:
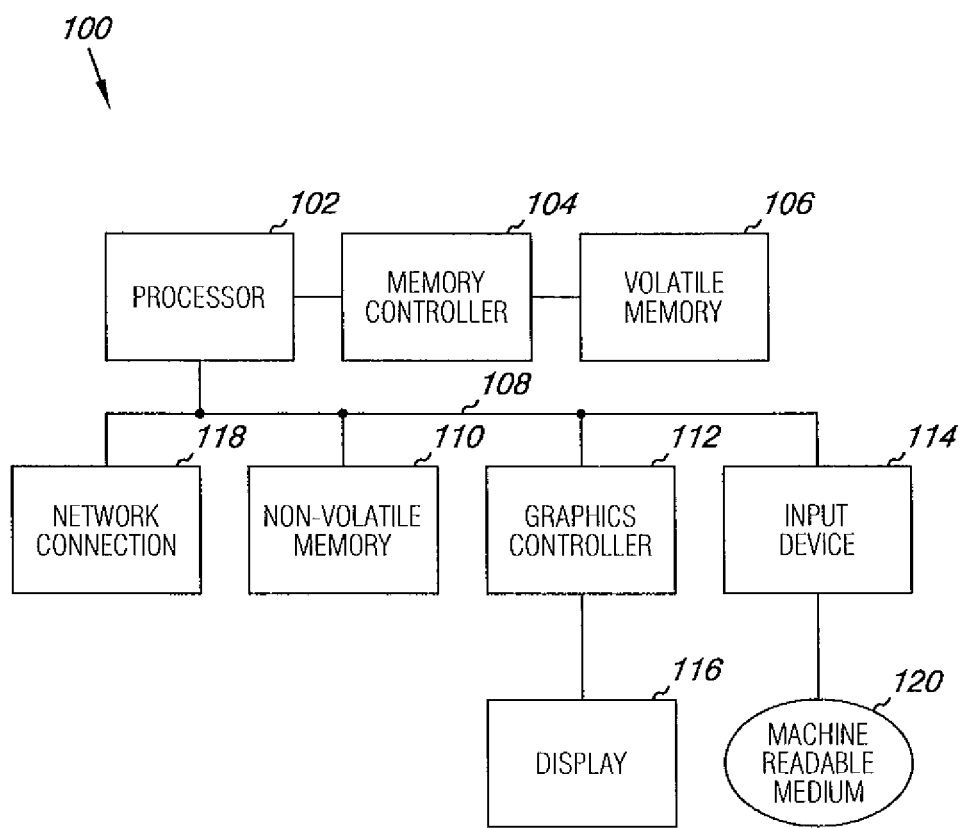
FIG. 1 illustrates a block diagram of an example of a system for collaborative filtering according to the present disclosure.

Systems, methods, and machine readable and executable instructions are provided for collaborative filtering. Collaborative filtering can include representing users and objects by rows and columns in a binary ratings matrix having a particular dimensional space. The binary ratings matrix and a weight matrix having the particular dimensional space can be hashed into a lower dimensional space by one of row and column. Unknown values in the binary ratings matrix can be weighted with the weight matrix. The hashed weighted binary ratings matrix can be low-rank approximated (e.g., by alternating least squares). A recommendation of one of the objects can be generated for one of the users based on the low-rank approximated hashed weighted binary ratings matrix.

A novel hashing technique, employing convex combinations can significantly reduce the size of the binary ratings matrix and provide an approximation of the same without sacrificing meaningful accuracy. Simulations of an example of a method according to the present disclosure have resulted in efficiency enhancements of three orders of magnitude (e.g., as measured by memory footprint during model training) as compared to some previous approaches that employ ordinary random sampling to approximate the binary ratings matrix.

A recommendation can be generated of an existing object for an existing user, both of which were previously included in the binary ratings matrix, based on the low-rank approximated hashed matrix. For example, an online movie rental service could generate a new recommendation of an existing movie for an existing user.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Elements shown in the various figures herein can be added, exchanged, and/or eliminated so as to provide a number of additional examples of the present disclosure. For example, 120 may reference element "20" in FIG. 1, and a similar element may be referenced as 420 in FIG. 4. In addition, the proportion and the relative scale of the elements provided in the figures are intended to illustrate the examples of the present disclosure, and should not be taken in a limiting sense.

FIG. 1 illustrates a block diagram of an example of a system 100 for collaborative filtering according to the present disclosure. The system 100 can include processor resources 102 and memory resources (e.g., volatile memory 106 and/or non-volatile memory 110) for executing instructions stored in a tangible nor-transitory medium (e.g., volatile memory 106, non-volatile memory 110, and/or machine readable medium 120) and/or an application specific integrated circuit (ASIC) including logic configured to perform various examples of the present disclosure. A machine (e.g., a computing device) can include and/or receive a tangible non-transitory machine readable medium 120 storing a set of machine readable instructions (e.g., software) via an input device 114. As used herein, processor resources 102 can include one or a plurality of processors such as in a parallel processing system. Memory resources can include memory addressable by the processor resources 102 for execution of machine readable instructions. The machine readable medium 120 can include volatile and/or non-volatile memory such as random access memory (RAM), magnetic memory such as a hard disk, floppy disk, and/or tape memory, a solid state drive (SSD), flash memory, phase change memory, etc. In some examples, the non-volatile memory 110 can be a database including a plurality of physical non-volatile memory devices. In various examples, the database can be local to a particular system or remote (e.g., including a plurality of non-volatile memory devices 110).

The processor resources 102 can control the overall operation of the system 100. The processor resources 102 can be connected to a memory controller 104, which can read and/or write data from and/or to volatile memory 106 (e.g., RAM). The memory controller 104 can include an ASIC and/or a processor with its own memory resources (e.g., volatile and/or non-volatile memory). The volatile memory 106 can include one or a plurality of memory modules (e.g., chips). A basic input-output system (BIOS) for the system 100 may be stored in non-volatile memory 110 or other non-volatile memory not specifically illustrated, but associated with the processor resources 102. The BIOS can control a start-up or boot process and control basic operation of the system 100.

The processor resources 102 can be connected to a bus 108 to provide for communication between the processor resources 102 and other portions of the system 100. For example, the bus 108 may operate under a standard protocol such as a variation of the Peripheral Component Interconnect (PCI) bus standard, or the like. The bus 108 can connect the processor resources 102 to the non-volatile memory 110, graphics controller 112, input device 114, and/or the network connection 118, among other portions of the system 100. The non-volatile memory 110 (e.g., hard disk, SSD, etc.) can provide persistent data storage for the system 100. The graphics controller 112 can connect to a display device 116, which can provide an image to a user based on activities performed by the system 100.

The system 100 can generate a recommendation based on a sparse pattern of data. The recommendation can reflect a likelihood that a particular user will prefer a particular item for which no user preference data relative to the particular user is available. The prediction may be based on data obtained from users other than the particular user for the particular item and/or on data obtained from the particular user for items other than the particular item. In some examples, the display device 116 can display a visual representation of the recommendation. In some examples, the recommendation can be provided to the particular user via the network connection 118 (e.g., when the user is remote to the system 100).

Performing one class collaborative filtering for matrices as large as possible may be desired, but may be limited by the processing capabilities of a given system (e.g., a computing system). Examples of the present disclosure can significantly reduce the processing time required to generate recommendations based on a binary ratings matrix by hashing the matrix into a lower dimensional space before performing an approximation of the matrix in a manner that permits calculations of solutions in the hashed space that are valid in the unhashed space after various computations. Thus, various examples of the present disclosure can enable a given system to perform one class collaborative filtering for larger matrices than would otherwise be practicable.

With respect to notation, upper case letters are used herein to denote matrices (e.g. R can denote a binary ratings matrix R). A letter with a single index denotes a row vector of a matrix having the same letter, with the index specifying the row of the matrix. For example, $U_i$ denotes a row vector for column i of the matrix U. Components of matrices are denoted using two indices. For example, $U_{ij}$ denotes the element in row i and column j of matrix U. A column vector is denoted by a letter with a single index following a period and comma. For example, $U_{.j}$ denotes a column vector for column j of the matrix U. For a matrix U, $\|U\|_F^2$ denotes the Frobenius norm. The vector 1 denotes the column vector that has 1 as the value of each component. Its dimensionality can be concluded from the context. Finally, I refers to the identify matrix.

A binary ratings matrix R can be generated and/or received and can include n rows (e.g., representing users) and m columns (e.g., representing objects). Such objects can include, for example, movies, books, URLs, or other objects for which users can express a preference (e.g. like or dislike). In some examples, preferences may be expressed explicitly (e.g., by having a user click on an indicator suggesting a like or dislike) or implicitly (e.g., a user could express a preference for a particular web page merely by visiting the web page). R may include only positives, since only positives are observable. Positives may be represented by a value of 1. Unobserved values are not necessarily negative (e.g., 0). Positive values are rare, however, so we substitute 0 for missing values and use weights to reflect confidence.

Referring generally to the binary ratings matrix R, it can have a particular dimensional space that to quite large. For example, a movie rental company, book seller, or the Internet may have a large number (e.g., millions) of movies, books, or web pages respectively for which users may express a preference. Accordingly, to reduce a burden on processing such a binary ratings matrix, a low-rank approximation of the binary ratings matrix can be sought.

For a given matrix $R \in \Box^{n \times m}$, a singular value decomposition (SVD) is a decomposition of the matrix $R = XSY^T$, where $X \in \Box^{n \times r}$ and $Y \in \Box^{m \times r}$ are orthogonal matrices, r is the rank of R, and S is a diagonal matrix with the singular values of R on its main diagonal. When projecting X, S, and Y onto the d≤r columns for which S has the highest singular values, the product of the three resulting matrices gives the best approximation $\tilde{R}$ of R of rank d with respect to $\|R - \tilde{R}\|_F^2$. The alternating least squares (ALS) algorithm allows incorporation of weights when using the SVD framework. Weights reflect the impact of approximation errors on the overall loss.

The following algorithm, in pseudo-code, provides a description of ALS:

Require: data matrix $R \in \Box^{n \times m}$, rank d, weight matrix W with the same dimensionality as R
Ensure: Matrices $X \in \Box^{N \times d}$ and $Y \in \Box^{m \times d}$
 Initialize Y randomly
 repeat
  Update $X_r, \forall r \in \{1, \ldots, n\}$
  Update $Y_c, \forall c \in \{1, \ldots, m\}$
 until convergence,
 return X and Y The variations of ALS discussed herein have the skeleton depicted in the algorithm above, but differ in terms of the loss function and corresponding updates of X and Y. The algorithm starts with a random matrix Y, and then alternates steps of optimizing X for fixed Y and of optimizing Y for fixed X. Since both these steps are perfectly symmetric, for rotational simplicity, only the case of optimizing X is discussed in detail.

ALS with regularization may improve results. Accordingly, the Tikhonov-regularization parameter λ may be used. An adaptation of the standard ALS loss function allows incorporation of weights. If W is the weight matrix, then weighted loss with respect to W can be defined as:

$$L_W(X, Y) := \sum_{i,j} W_{i,j} \left( \begin{array}{c} (R_{i,j} - X_i Y_j^T)^2 + \\ \lambda(\|X_i\|_F^2 + \|Y_j\|_F^2) \end{array} \right)$$

The problem of updating X to minimize the loss $L_W$ still has a closed-form:

$$X_r := R_r \tilde{W}_r Y \left( Y^T \tilde{W}_r Y + \lambda \left( \sum_{i \in M} W_{r,i} \right) I \right)^{-1}, \quad (1)$$

where $\tilde{W}_r$ is an n×n diagonal matrix with the weights of row r on the main diagonal.

In the one class case, there is a small fraction of known positive entries and a much larger number of unknown, mostly negative entries. Zeros can be substituted for unknown values, while positive values can be represented by a value of one. In this case, there are no missing values in the ratings matrix R. However, the confidence in "0" entries being positive is significantly less than the confidence in "1" entries being positive. Confidence can be represented in terms of a separate weight matrix W, which has the same dimensionality as R and assigns a weight to each entry in R. The weight matrix W can be composed of values from 0 to 1, inclusive. A low value in the weight matrix W can represent a low confidence in the rating while a high value in the weight matrix can represent a high confidence in the rating. For example, the weight matrix W can include a value of 1 corresponding to each of the indices in the binary ratings matrix R that have a value of 1 (e.g., a high weight can be assigned to a rating of 1 where the rating is derived from actual user feedback by expressing a preference for a particular object). In some examples, the value of a particular index in the weight matrix W can represent a decimal equivalent of a percentage confidence in the corresponding rating from the binary ratings matrix R (e.g. 1 can represent 100% confidence). The weight matrix W car be subject to a positively constraint such that the values in the weight matrix W are positive, where for purposes of the positively constraint 0 is considered to be positive.

Where a particular value in the weight matrix W corresponding to a 0 value for a particular index in the binary ratings matrix R is between 0 and 1, a confidence between the extremes of "unknown" and "negative rating" is represented. There are different sources for weighting schemes, ranging from domain experts over background knowledge to heuristic constructions. Three examples of such heuristic representations of confidence are described below.

First, a "uniform" approach can include fixing a value of confidence in the weight matrix W that the unknown values represent negative ratings. Such an approach may be beneficial for a large binary ratings matrix that includes few observations and few positives. Accordingly, a value of 0 can be assigned for unknown values in the binary ratings matrix R, but a low weight can be assigned to a corresponding index in the weight matrix W (e.g., $V_{i,j}=\delta$). Weighting the unknown values in the binary ratings matrix can include weighting unknown values with a fixed weight that is directly proportional to a size of the binary ratings matrix (e.g., where the fixed weight is greater for a smaller binary ratings matrix and lesser for a larger binary ratings matrix).

Second, a "user-oriented" approach can include assigning a relatively greater confidence for a particular index in a weight matrix W for a particular user about whom a relatively greater amount of information is known. That is, for a first user having a relatively large number of observed ratings, a greater confidence can be used in a weight matrix W for the first user, while for a second user having a relatively small number of observed ratings, a lesser confidence can be used in a weight matrix W for the second user. Such a "user-oriented" approach can be represented notationally by: $W_{i,j} \propto \Sigma_i R_{i,j}$.

Third, an "object-oriented" approach can assign greater confidence to objects that are popular (e.g., have many positive ratings in the binary ratings matrix R). Accordingly, if a particular object is popular and a particular user has not expressed a preference for the object, a 0 can be assigned in a corresponding index in the binary ratings matrix R and a relatively high value (e.g. close to 1) can be assigned in the corresponding index in the weight matrix W for the particular user. Such an "object-oriented" approach can be represented notationally by: $W_{i,j} \propto m - \Sigma_i R_{i,j}$. Although three examples of heuristic constructions for weighting are described separately, some examples of the present disclosure can include combinations of a number of different weighting schemes.

Generating a low-rank approximation of the binary ratings matrix can itself be quite intensive on processing resources when the binary ratings matrix R is sufficiently large.

Examples of the present disclosure provide for hashing the binary ratings matrix R to reduce the burden or processing resources for low-rank approximating the binary ratings matrix.

Some examples of the present disclosure can include the use of a projection matrix $\pi$ that is a matrix including p rows and n columns (p×n) where the number p is much smaller than the number n (p<<n). For example, p can be three orders of magnitude smaller than n, however examples are not so limited. Each row of the projection matrix $\pi$ ($\pi_i$) can be a row vector formed by stochastically sampling from the m-dimensional simplex of the binary ratings matrix R such that $sum_i \pi_{ij}=1$ (e.g., a convex combination), where $\pi_{ij}$ is a coefficient (e.g., a numerical value) of the projection matrix P. Alternatively, each column of the projection matrix $\pi$ ($\pi_j$) can be a column vector formed by stochastically sampling from the m-dimensional simplex such that $sum_j \pi_{ij}=1$. In either case, stochastically sampling can include combining one of objects and users into groups of objects or users. The projection matrix $\pi$ can include a convex combination normalization with a positivity constraint (e.g., each coefficient is non-negative and sums to one).

We go from the original space with a ratings matrix R (after substituting zeros for unknowns) and a weight matrix W to a projected space with a much smaller rating matrix R' and a weight matrix W'.

For a given projection matrix $\pi$, define:

$$W':=\pi W$$

$$R':=\pi R/W',$$

where "/" denotes element-wise matrix division.

If rows in R (and W) correspond to users, then the projection defines a fewer number of "pseudo-users", each of which is a convex combination of "real" users in the original space. Analogously, the construction allows definition of a space of pseudo-items by projecting along the other dimension of the matrix.

Employing such a projection matrix $\pi$ for hashing the binary ratings matrix R differs from random projections at least because random projections do not include a positivity constraint (e.g., the positivity constraint on W' according to some examples of the present disclosure). Accordingly, as described herein with respect to the use of alternating least squares, examples of the present disclosure do not employ straight-forward singular value decomposition (SVD) because of the presence of missing values and the notion of a weight matrix.

Matrix factorization in the projected space corresponds to applying the previously described ALS algorithm on the projected rating matrix R' and projected weight matrix W'. Because of the reduced dimensionality of R' and W', the training is more efficient compared to training on R and W. The ALS algorithm can provide an initial solution X' and Y' (e.g., $X'Y'^T$) that approximates R'.

At deployment time, the model will operate in the original space. At any point during ALS training it is sufficient to store either X or Y because of the alternating nature of the algorithm. If X' is operating in the projected space, then Y' is still operating in the same space as Y. A result of the low-rank approximation for the row or column can be updated using the binary ratings matrix R and the weight matrix W. That is, by keeping Y' fixed, one can perform one final "half-Iteration" using the original R and W to compute X*, such that $X*Y'^T$ is a valid approximation of R. Further, this last half-step can be performed for each user separately on demand because of the nature of ALS (using Equation (1)). Even if the original set of users at training time is huge there is no need to perform a "full" computation of X*.

Figure 2:
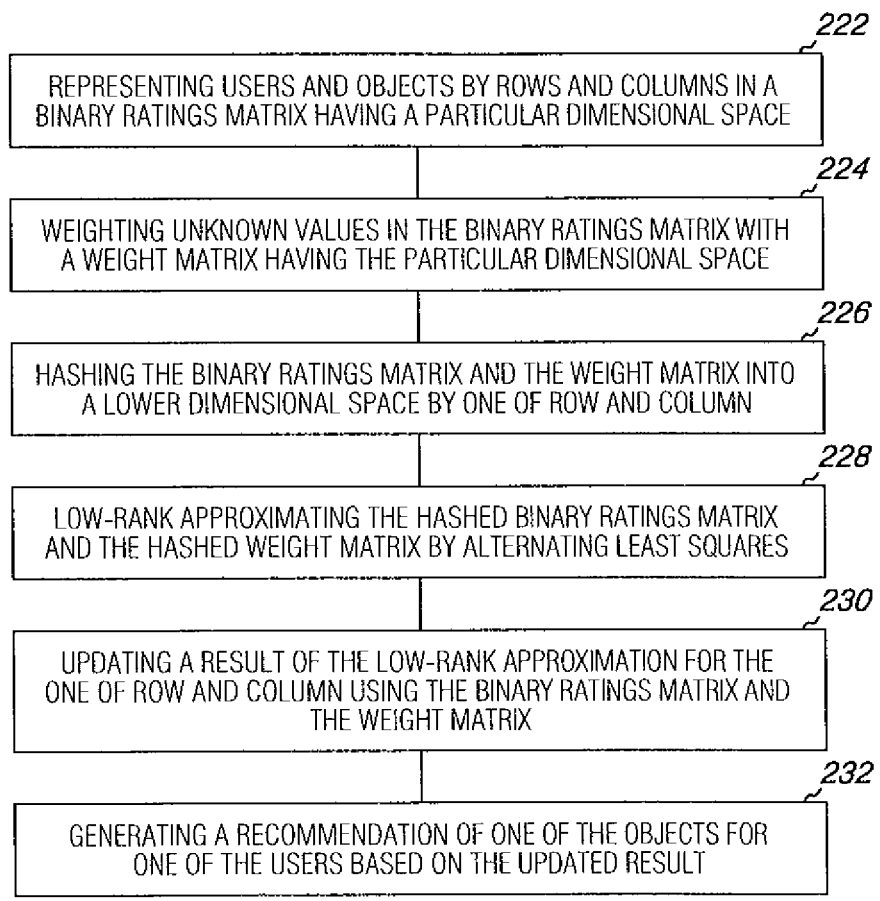
FIG. 2 provides a flow chart illustrating an example of a method for collaborative filtering according to the present disclosure.

FIG. 2 provides a flow chart illustrating an example of a method for collaborative filtering according to the present disclosure. The method includes representing 222 users and objects by rows and columns in a binary ratings matrix having a particular dimensional space. The method includes weighting 224 unknown values in the binary ratings matrix with a weight matrix having the particular dimensional space. The method includes hashing 226 the binary ratings matrix and the weight matrix into a lower dimensional space by one of row and column. The method includes low-rank approximating 228 the hashed binary ratings matrix and the hashed weight matrix (e.g., by alternating least squares). The method includes updating 230 a result of the low-rank approximation for the one of row and column using the binary ratings matrix and the weight matrix. The method also includes generating 232 a recommendation of one of the objects for one of the users based on the low-rank approximated hashed weighted binary ratings matrix.

Figure 3:
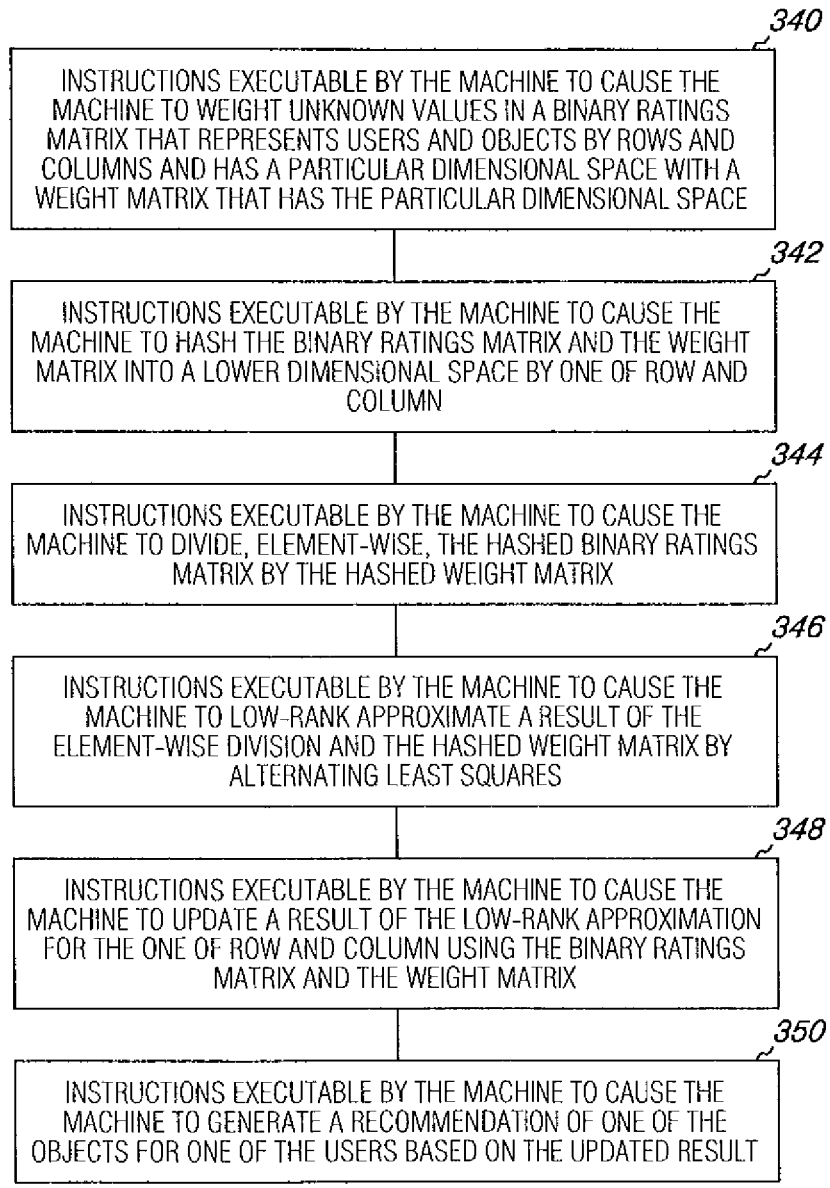
FIG. 3 illustrates a block diagram illustrating an example of machine readable non-transitory medium storing a set of instructions executable by the machine to cause the machine to perform collaborative filtering according to the present disclosure.

FIG. 3 provides a block diagram illustrating an example of machine readable non-transitory medium storing a set of instructions executable by the machine to cause the machine to perform collaborative filtering according to the present disclosure. The medium can store instructions 340 executable by the machine to cause the machine to weight unknown values in a binary ratings matrix that represents users and objects by rows and columns and has a particular dimensional space with a weight matrix that has the particular dimensional space. The medium can also store instructions 342 executable by the machine to cause the machine to hash the binary ratings matrix and the weight matrix into a lower dimensional space by one of row and column. The medium can store instructions 344 executable by the machine to cause the machine to divide, element-wise, the hashed binary ratings matrix by the hashed weight matrix. The medium can also store instructions 346 executable by the machine to cause the machine to low-rank approximate a result of the element-wise division and the hashed weight matrix (e.g. by alternating least squares). The medium can store instructions 348 executable by the machine to cause the machine to update a result of the low-rank approximation for the one of row and column using the binary ratings matrix and the weight matrix. The medium can store instructions 350 executable by the machine to cause the machine to generate a recommendation of one of the objects for one of the users based on the updated result.

Machine readable and executable instructions and/or logic, which are operable to perform the method described in connection with FIGS. 2 and/or 3, can be present in whole or in part in the examples of other figures. Embodiments, however, are not limited to the particular examples given herein. Unless explicitly stated, the examples described herein are net constrained to a particular order or sequence. Additionally, some of the described examples, or elements thereof, can occur or be operated at the same, or at least substantially the same, point in time.

Figure 4:
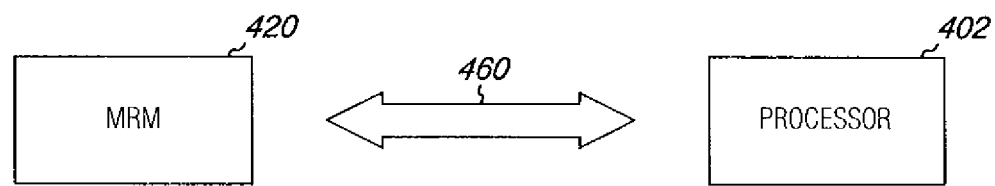
FIG. 4 illustrates a block diagram of an example of a machine readable medium in communication with processor resources according to the present disclosure.

FIG. 4 illustrates a block diagram of an example of a machine readable medium 420 in communication with processor 402 resources according to the present disclosure. A machine (e.g., a computing device) can include and/or receive a tangible non-transitory machine readable medium (MRM) 420 storing a set of machine readable instructions (e.g., software) for managing settings of a computing device, as described herein. As used herein, processor 402 resources can include one or a plurality of processors such as in a parallel processing system. The machine readable medium 420 can include volatile and/or non-volatile memory such as random access memory (RAM), magnetic memory such as a hard disk, floppy disk, and/or tape memory, a solid state drive (SSD), flash memory, phase change memory, etc.

The MRM 420 can be in communication with the processor 402 resources via a communication path 460. The communication path 460 can be local or remote to a machine associated with the processor 402 resources. Examples of a local communication path 460 can include an electronic bus internal to a machine such as a computer where the MRM 420 is one of volatile, non-volatile, fixed, and/or removable storage medium in communication with the processor 402 resources via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path 460 can be such that the MRM 420 is remote from the processor 402 resources such as in the example of a network correction between the MRM 420 and the processor 402 resources (e.g. the communication path 460 can be a network connection). Examples of such a network connection can include a local area network (LAN), a wide area network (WAN), a personal area network (PAN), the internet, among other examples of networks. In such examples, the MRM 420 may be associated with a first machine (e.g., a server) and the processor 402 resources may be associated with a second machine (e.g., a computing device). The first and second machines can be in communication via a networked communication path 460.

It is to be understood that the above description has been made in an illustrative fashion, and not a restrictive one. Although specific examples have been illustrated and described herein, other component arrangements, instructions, and/or device logic can be substituted for the specific examples shown.

What is claimed:

1. A computing device implemented method for collaborative filtering, comprising:
   representing users and objects for which users can express a preference by rows and columns in a binary ratings matrix having a particular dimensional space, wherein the binary ratings matrix includes values, wherein a value indicates a preference of a user for an object;
   weighting unknown values in the binary ratings matrix with a weight matrix having the particular dimensional space;
   hashing the binary ratings matrix and the weight matrix into a lower dimensional space by one of row and column, wherein hashing includes stochastically sampling a dimensional simplex of the binary ratings matrix by the one of row and column;
   low-rank approximating the hashed binary ratings matrix and the hashed weight matrix by alternating least squares;
   updating a result of the low-rank approximation for the one of row and column using the binary ratings matrix and the weight matrix; and
   generating a recommendation of one of the objects for one of the users based on the updated result.

2. The method of claim 1, wherein low-rank approximating the hashed binary ratings matrix and the hashed weight matrix by alternating least squares includes element-wise dividing the hashed binary ratings matrix by the hashed weight matrix.

3. The method of claim 1, wherein the method includes weighting observed positives in the binary ratings matrix with a value of 1; and wherein weighting unknown values includes assigning a value of 0 to the unknown value and weighting the assigned 0 such that a greater weight is indicative of a greater probability that the unknown value is 0.

4. The method of claim 3, wherein weighting the unknown values in the binary ratings matrix includes weighting unknown values with a fixed weight that is directly proportional to a size of the binary ratings matrix.

5. The method of claim 3, wherein weighting the unknown values in the binary ratings matrix includes:

assigning lesser weights to a first user who is associated with a first number of unknown values in the binary ratings matrix;

assigning greater weights to a second user who is associated with a second number of unknown values in the binary ratings matrix, wherein the first number is greater than the second number;

assigning lesser weights to a first object that is associated with a third number of unknown values in the binary ratings matrix; and assigning greater weights to a second object that is associated with a fourth number of unknown values in the binary ratings matrix, wherein the fourth number is greater than the third number.

6. The method of claim 3, wherein weighting the unknown values in the binary ratings matrix includes assigning weights based on background knowledge of domain experts.

7. The method of claim 1, wherein hashing includes hashing the binary ratings matrix and the weight matrix by the one of row and column that is larger.

8. The method of claim 1, wherein:

hashing includes convex combination hashing the binary ratings matrix and the weight matrix into the lower dimensional space by the one of row and column, wherein the one of row and column represents objects; and wherein hashing includes stochastically combining objects into groups of objects.

9. A machine readable non-transitory medium storing a set of instructions executable by the machine to cause the machine to:

weight unknown values in a binary ratings matrix that represents users and objects for which users can express a preference by rows and columns and has a particular dimensional space with a weight matrix that has the particular dimensional space, wherein the binary ratings matrix includes values, wherein a value indicates a preference of a user for an object;

hash the binary ratings matrix and the weight matrix into a lower dimensional space by one of row and column, wherein to hash includes to stochastically sample a dimensional simplex of the binary ratings matrix by the one of row and column;

divide, element-wise, the hashed binary ratings matrix by the hashed weight matrix;

low-rank approximate a result of the element-wise division and the hashed weight matrix by alternating least squares;

update a result of the low-rank approximation for the one of row and column using the binary ratings matrix and the weight matrix; and generate a recommendation of one of the objects for one of the users based on the updated result.

10. The medium of claim 9, wherein the instructions cause the machine to hash the binary ratings matrix by convex combination hashing including stochastically sampling a dimensional simplex of the binary ratings matrix by the one of row and column such that a sum of stochastically sampled coefficients is one and each of the stochastically sampled coefficients is positive.

11. The medium of claim 10, wherein the instructions cause the machine to stochastically sample the dimensional simplex of the binary ratings matrix such that the hashed binary ratings matrix is three orders of magnitude smaller than the binary ratings matrix.

12. A system for collaborative filtering, comprising:

a processor;

volatile memory coupled to the processor;

non-volatile memory coupled to the processor, wherein the non-volatile memory stores a binary ratings matrix representing users and objects for which users can express a preference by rows and columns and having a particular dimensional space, wherein the binary ratings matrix includes values, wherein a value indicates a preference of a user for an object;

a network connection coupled to the processor;

wherein the system receives a rating from a respective one of the users via the network connection for a respective one of the objects and updates the binary ratings matrix stored in the non-volatile memory;

wherein the processor executes instructions to:

weight unknown values in the binary ratings matrix with a weight matrix having the particular dimensional space;

hash the binary ratings matrix and the weight matrix into a lower dimensional space by one of row and column, wherein to hash includes to stochastically sample a dimensional simplex of the binary ratings matrix by the one of row and column;

divide, element-wise, the hashed binary ratings matrix by the hashed weight matrix;

low-rank approximate a result of the element-wise division and the hashed weight matrix by alternating least squares;

update a result of the low-rank approximation for the one of row and column using the binary ratings matrix and the weight matrix; and generate a recommendation for one of the objects for a user based on the low-rank approximated hashed weighted binary ratings matrix.

13. The system of claim 12, wherein the non-volatile memory comprises a database including a plurality of non-volatile memory devices.

14. The system of claim 12, wherein the system further includes a graphics controller coupled to the processor and coupled to a display device, and wherein the processor executes instructions to display a visual representation of the recommendation.

15. The system of claim 12, wherein the processor executes instructions to provide the recommendation to the user via the network connection.

16. A computing device implemented method for collaborative filtering, comprising:

receiving a binary ratings matrix having a particular dimensional space, in which users and objects for which users can express a preference are represented by rows and columns, wherein the binary ratings matrix includes values, wherein a value indicates a preference of a user for an object;

weighting unknown values in the binary ratings matrix with a weight matrix having the particular dimensional space;

hashing the binary ratings matrix and the weight matrix into a lower dimensional space by one of row and column, wherein hashing includes stochastically sampling a dimensional simplex of the binary ratings matrix by the one of row and column;

approximating the hashed binary ratings matrix and the hashed weight matrix;

updating a result of the approximation for the one of row and column using the binary ratings matrix and the weight matrix; and generating a recommendation of one of the objects for one of the users based on the updated result.

\* \* \* \* \*